Figure 1:
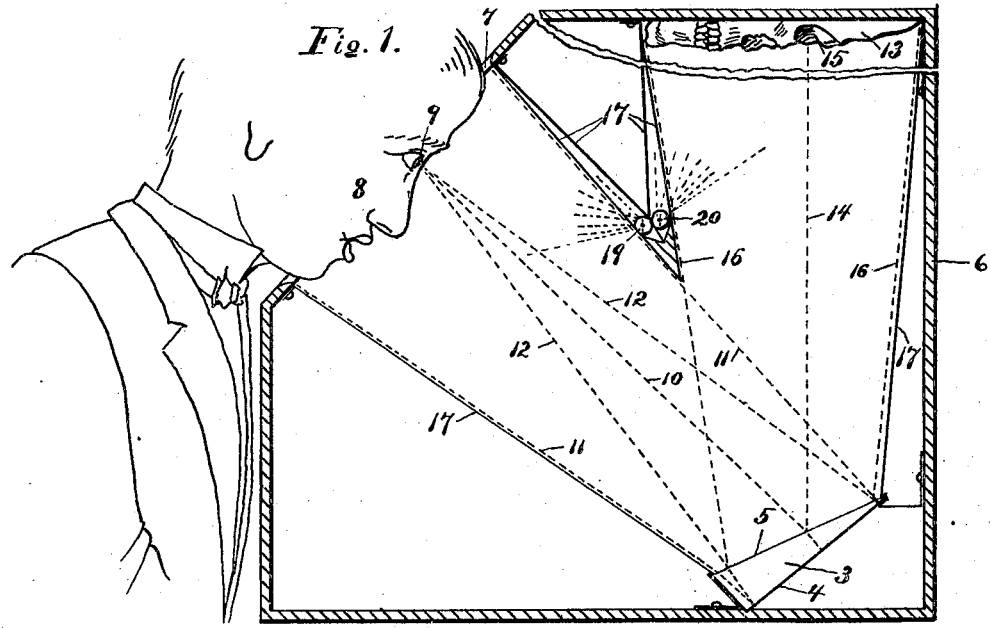

No. 769,799. PATENTED SEPT. 13, 1904.
M. C. HOPKINS.
APPARATUS FOR PRODUCING OPTICAL ILLUSIONS.
APPLICATION FILED OCT. 7, 1903.
NO MODEL. 4 SHEETS—SHEET 1.

Witnesses
Robert Barry
August Kost

Marcus C. Hopkins
Inventor

No. 769,799. PATENTED SEPT. 13, 1904.
M. C. HOPKINS.
APPARATUS FOR PRODUCING OPTICAL ILLUSIONS.
APPLICATION FILED OCT. 7, 1903.
NO MODEL. 4 SHEETS—SHEET 2.
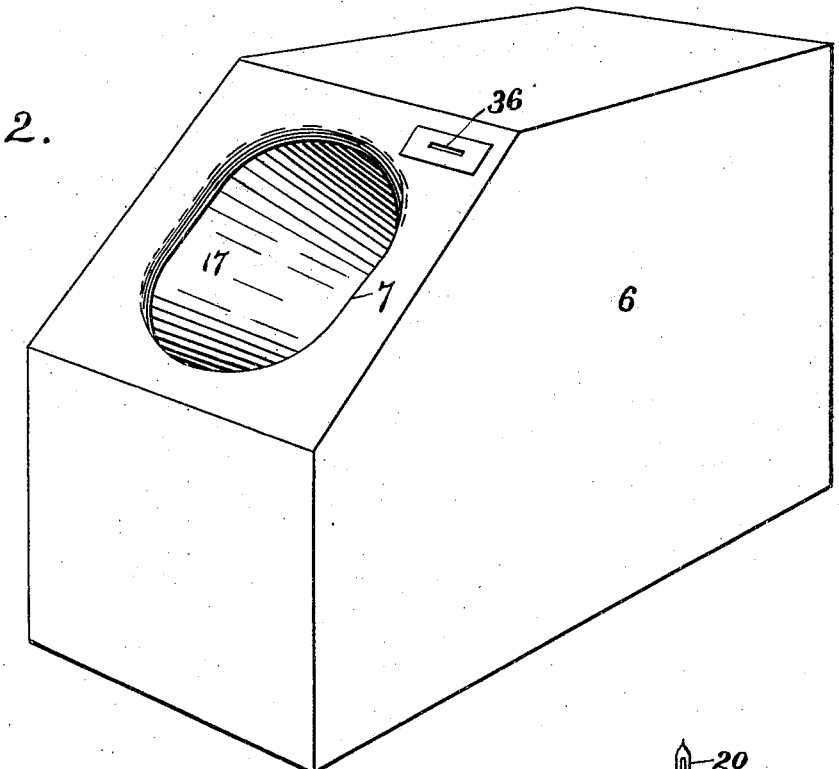
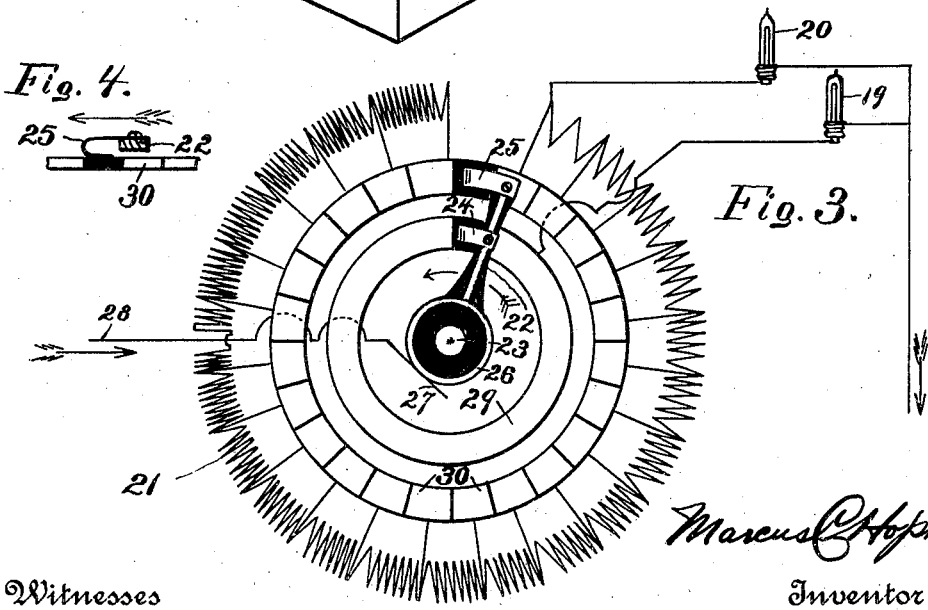
Witnesses
Robert Barry
August Katz Jr
Marcus C. Hopkins
Inventor

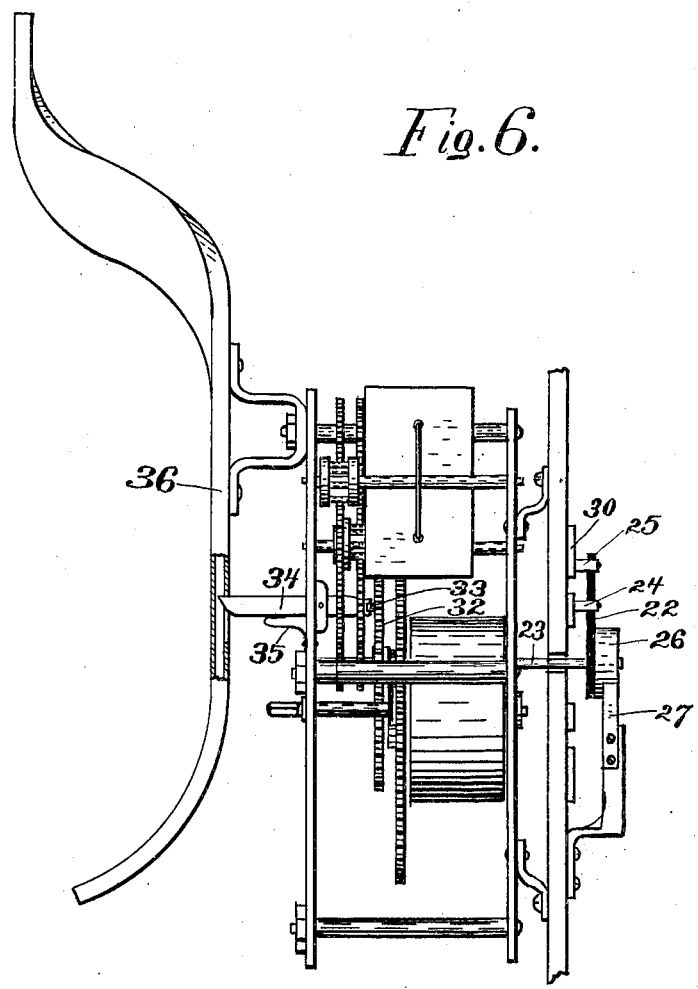

No. 769,799. PATENTED SEPT. 13, 1904.
M. C. HOPKINS.
APPARATUS FOR PRODUCING OPTICAL ILLUSIONS.
APPLICATION FILED OCT. 7, 1903.
NO MODEL. 4 SHEETS—SHEET 4.

Witnesses
Robert Barry
August Koot

Marcus C. Hopkins
Inventor

No. 769,799. Patented September 13, 1904.

UNITED STATES PATENT OFFICE.

MARCUS C. HOPKINS, OF JERSEY CITY, NEW JERSEY, ASSIGNOR TO ILLUSION COMPANY, OF NEW YORK, N. Y., A CORPORATION OF NEW YORK.

APPARATUS FOR PRODUCING OPTICAL ILLUSIONS.

SPECIFICATION forming part of Letters Patent No. 769,799, dated September 13, 1904.

Application filed October 7, 1903. Serial No. 176,128. (No model.)

*To all whom it may concern:*

Be it known that I, MARCUS C. HOPKINS, a citizen of the United States, residing at Jersey City, in the county of Hudson and State of New Jersey, have invented new and useful Improvements in Apparatus for Producing Optical Illusions, of which the following is a specification.

My invention relates to apparatus for producing optical illusions; and it consists in providing a device for conducting rays from separate sources to the eye of the observer as apparently coming from one source, in providing a novel combination of such a device with objects to produce optical illusions, in providing means for the production of light effects for producing illusions, in providing automatic control for said light-effect-producing means, in providing means for the positionment of the observer in such connection, in providing means whereby an observer is enabled to witness illusions dealing with his or her person or portions thereof, in providing coin-control for said devices and means, in combinations of said features, and in devices, features of construction, and combinations hereinafter described, and particularly pointed out in the appended claims.

Some of the objects of this invention are to provide a device whereby rays may be conducted from separate sources to the eye of the observer coincidently; to provide a device which will present to the eye of the observer a single image each of two objects apparently occupying the same position; to provide means for insuring the correct positionment of the parts of the device, the object or objects, and the observer; to provide automatic devices for producing the light effects necessary to the production of the illusion; to provide coin-control for such devices, and to produce a compact commercial device capable of fulfilling all of the conditions incident to the amusement of and operation by the public in general.

I have illustrated the principle upon which my invention is based and one form in which it may be embodied in the accompanying drawings, in which like reference characters designate like parts throughout the several views.

Figure 5:
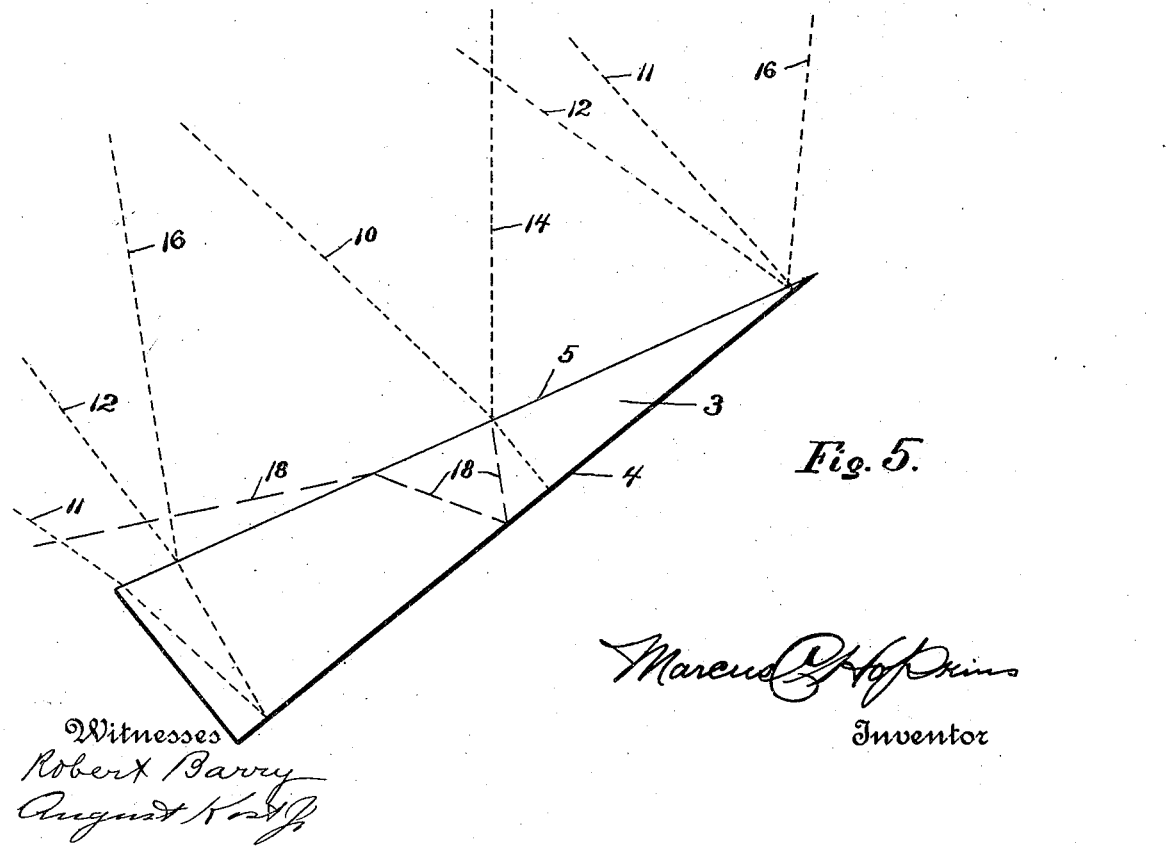
Figure 7:
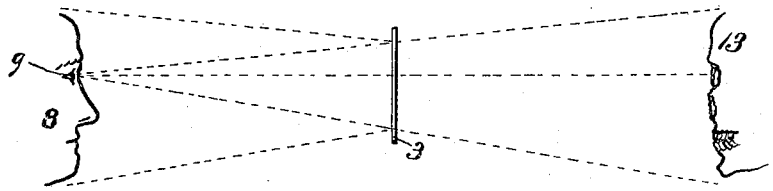
Figure 8:
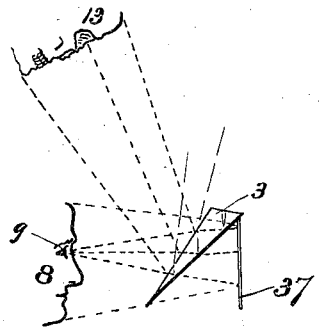
Figure 9:
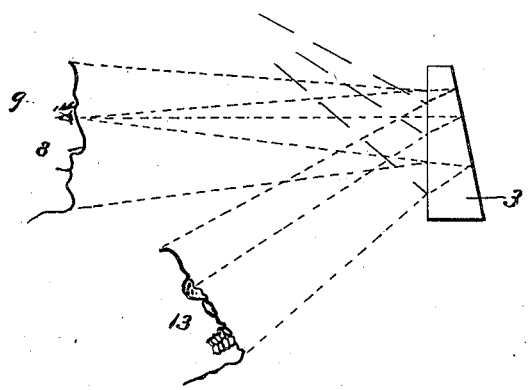

In the drawings, Figure 1 is a longitudinal vertical section of one form embodying my invention, partly broken away. Fig. 2 is a view in perspective of the inclosing casing. Fig. 3 is a face view of the rheostat. Fig. 4 is a detail cross-section of the rheostat-arm. Fig. 5 is a diagrammatic edge view of the mirror. Fig. 6 is an end view of the motor movement and coin-control, and Figs. 7, 8, and 9 are diagrams of certain other applications of the principle.

Referring to the drawings and particularly to the device shown in Fig. 1, I employ a glass 3, which has the form of a wedge having two plane surfaces 4 and 5 inclined to one another. I preferably silver the surface 4 and mount the glass 3 in a case 6, which has an aperture 7, in such a manner that the face 8 of an observer placed in the aperture 7 will be reflected from the silvered surface 4 of glass 3, so as to present to the eye 9 of the observer a complete image of his face 8. In constructing a very compact device I prefer to use about a fifteen-degree prism for the glass 3. It will be noted that the rays from the face 8 to the reflecting-surface 4 are bent by refraction on entering the glass 3, so that to cause the ray 10 from the pupil of the observer's eye to fall perpendicularly upon the surface 4 and be reflected back to the observer's eye the surface 4 is not placed perpendicular to said ray as it leaves the observer's eye. Advantages obtained by this construction will be hereinafter enumerated. Attention is also called to the fact that such of the rays emanating from the face 8 of the observer as are reflected from the surface 5 are not reflected back into the field of vision of the observer, but elsewhere, so that but one image is seen by the observer, which is not the case with ordinary glass mirrors having two parallel plane surfaces. In Fig. 1 I have indicated the outside limits of the rays from the face 8 falling upon the surface 4 by dotted lines 11 and the outside limits of the reflected rays from the face 8 reflected from the surface 4 to the eye 9 of the observer by dotted lines 12. It will be clearly seen without further illustration that those parts of the rays 10 and 11 which are reflected from surface 5 will not enter the field of vision of the observer's eye.

I place within the casing 6 an object 13, which I have illustrated as a skull. The skull 13 is so placed that a ray 14 (shown in dotted lines from its eye-socket 15 to the surface 5) will be reflected from said surface 5 to the eye 9 of the observer coinciding with the ray 10, and the outside limits rays 16 (shown in dotted lines from the skull 5) will be reflected to the eye of the observer coinciding with the rays 12. The distance from the observer's face 8 to the skull 13, measured along the ray 10 to the surface 5 and from thence along the ray 14, should be the same as the distance measured along the ray 10 to the surface 4 and from thence back to the eye of the observer, or approximately the same. When a skull is used, a natural-sized one should be employed. Therefore the skull and the reflected face will appear to occupy the same position when each is lighted up. In carrying out the illusion it is desired to cause one's face to gradually turn into a skull or other object. I surround the rays from the face to the glass and from the skull to the glass with casings 17 in the form of flattened cones which intercept.

In Fig. 5 I have shown an enlarged view of the glass 3 about actual size for a face and have indicated the rays in connection therewith. It will be noted upon this figure that that portion 18 of ray 14 from the skull which enters the glass and is reflected from surface 4 does not pass into the field of vision of the observer. Therefore the observer will not see two reflections of the skull, as would be the case were a glass mirror having two parallel planes used at an angle to reflect.

I place two electric lamps within the device—one, 19, to shine upon the face of the observer and shielded from the glass 3 and another, 20, to shine upon the skull shielded from the glass 3. To produce the illusion, the lamp 19 must first light up the face of the observer and then light should be gradually thrown by lamp 20 on the skull and the manipulation of the light be such that the face seen by the observer very gradually turns into a skull. This may be done by simultaneously lowering lamp 19 and lighting up lamp 20; but as lamp 19 is necessarily seen by the observer and as any change taking place in it would distract the attention of the observer from the glass I maintain the candle-power of the lamp 19 constant throughout the production of the illusion and make said lamp of only such candle-power as is necessary to permit of a good reflection when there is no light on the skull. I then gradually light up the lamp 20 by means of a rheostat 21 until the light is so strong upon the skull 13 that the reflection of said skull so predominates the reflection of the face that said reflection of the face is rendered practically invisible.

I am aware that one object has been caused to apparently fade into another; but this has heretofore been accomplished by placing a glass having two parallel planes at an angle between the observer and one object and reflecting the other object from its surface; but as the other object will be reflected from both surfaces two reflections will be seen, and it has been necessary to cause the observer to be placed at a distance from said glass great enough to render these two reflections practically one. This method is imperfect and impracticable where the change is sought to be brought about close to the eye of the observer, as is the case in a compact device for slot-machine purposes. I am not aware that a wedge-shaped glass has ever been used in this connection nor that a device wherein the observer sees a change in himself or herself has ever been attempted.

Owing to the refraction incident to the prism-shaped glass used a slight dispersion will be present in the image of the observer; but it is not sufficient to be noticeable and is not present at all in the image of the object.

It is obvious that the observer may be considered in some connections as a second object and that the two reflecting-surfaces receive the rays from the two objects and reflect them coincidently, so that in the line of reflection images of both the objects may be seen apparently occupying the same portion of space.

Referring to Fig. 3, illustrating the rheostat, it will be noticed that an arm 22 is fast on a shaft 23 and carries contacts 24 and 25. The contacts 24 and 25 are both connected with a ring 26, upon which ring 26 a brush 27 bears and conveys a current from the incoming wire 28 to said contacts 24 and 25. The contacts 24 and 25 are shown resting upon a dead-point and no current passes through the machine. The rheostat is made in a circular form, and therefore to complete the operation once the arm 22 should make one complete revolution passing from the dead-point and again returning thereto. To do this, I provide a motor which when released will make one revolution and stop until again released, which motor will be hereinafter described. The inner circle 29 of the rheostat is a contact-strip which is connected with the lamp 19, which shines upon the face of the observer, so that the moment the arm 22 begins to move the contact 24 will pass on to the ring 29, lighting the lamp 19 and maintain it lighted until the completion of the revolution of the rheostat and the dead-point is reached. The outer circle of contacts 30 are connected with resistance-coils and the contact 25 rides upon them, cutting in first all of the resistance, which merely starts current through the lamp 20, makes but a faint glow upon the skull, and successively cuts out portions of the resistance, gradually increasing the candle-power of the lamp 20 until its full candle-power is reached, when the contact 25 passes on to the dead-point and the motor stops, completing a single operation. Any form of motor may be used which will make one revolution and stop after having been released, and I have shown one form of such motor in Fig. 6. Here a spring-motor with fan-governor drives the rheostat through a spindle 23, and on the spur-wheel 32, fast on spindle 23, a pin 33 is mounted. A lever-arm 34 is pivoted upon the frame of the spring-motor and held in position, retarding and preventing the movement of the wheel 32 by a spring 35. The lever 34 projects into a coin-slot 36, and a coin falling into said slot trips said lever 34, tilting it and allowing pin 33 to clear, when the motor will run one revolution and be stopped at the dead-point of the rheostat by the contacts of the lever 34 by the pin 33. It is obvious that other forms of tripping mechanism may be used and other forms of motor so long as a single revolution is imparted to the rheostat. I have shown in Fig. 4 a peculiar form of contact which is most suitable for this form of rheostat, it being bent forwardly and under, moving in the direction of the arrow. The action of this form is to maintain pressure upon the contact-surface of the contact by the forward movement of the arm 22 and the friction of the contact upon the points of the rheostat.

In Fig. 7 I have shown one possible form in which my invention may be embodied; and it consists of placing a glass plate midway between the object and the observer perpendicular to the ray from the eye of the observer to the corresponding point of the object.

In Fig. 8 I have shown another form in which my invention may be embodied, which consists in placing a mirror 37 at the rear of a wedge-shaped glass.

In Fig. 9 I have illustrated another form in which my invention may be embodied, which consists in placing the front surface of the wedge-shaped glass perpendicular to the ray from the eye of the observer to the corresponding point of the object.

It is necessary for the perfect production of the illusion to place the observer at approximately the right distance from the reflecting-surfaces and to cause him or her to assume a position where the reflection of the eyes, nose, mouth, and other features will correspond with the like or corresponding points in the object. As this device is not calculated or intended to be accompanied by an attendant who will explain to the observers just the position and distance necessary to the perfect illusion and as this cannot be done by explanations and directions printed upon the machine, I have conceived the following method for securing the exact positionment of the observer by himself and without the aid of lengthy directions: I make the reflecting-surface for the reflection of the observer's face of only such area as will present a reflection of the observer's full face to the observer when the observer is correctly positioned relatively of the corresponding points in the object, and as a person unconsciously positions himself before a mirror so that a full-face reflection may be had this feature enables me to cause the observer to correctly position himself. The aperture 7 in the casing 6 indicates approximately the correct distance from the reflecting-surfaces, and when the observer applies his face to this aperture the distance will be so nearly exact that the illusion will be perfect. It will be seen that an observer need only drop a coin in the slot and apply his face to the aperture 7, when the illusion will be automatically carried out, aided by his unconscious positionment, and that the device is free from possible tampering by the curious, is compact, and that the mechanism being completely inclosed and concealed the device is most inexplicable and amusing.

I have termed the slanting wall of the casing 6 and the aperture 7 therein the "observer-locator," as it determines the relative position of the observer before the reflecting-surfaces and the distance required for the observer to be before the reflecting-surfaces.

It will be noted that the ray 10, falling upon the glass 3, is refracted somewhat away from that side where the object is stationed, and therefore the angle formed by the ray 10 and the ray 14 is greater with a prism of given degree than would be the case if this refraction did not take place. This is a great advantage in that as the greatness of this angle determines the closeness that the object and the observer may be placed to the reflecting-surfaces it enables the object and the observer to be placed closer and the device made more compact than would be the case if this refraction did not take place. It will also be noticed that the lights must be placed at a sufficient distance in front of the observer and the object to shine thereon, and as I prefer to place the light upon the face of the observer above the observer the greatness of the angle allows for a space in which to put this light or both of the lights. I desire to have the tubes 17, inclosing the field of vision, extend for a considerable distance from the face of the observer before intersecting, as this renders the point of intersection less noticeable, while if the tubes were caused to diverge in a horizontal plane of the face the angle, and consequently the prism, would not have to be as great a degree. I prefer to use the angle of the vertical plane, as it produces a more compact device.

It is obvious that various changes in the details of construction and arrangement and in the manner of mounting this device to suit the exigencies of various conditions and circumstances may be made without departing from the spirit of my invention, and it is also obvious that this invention may be applied to devices on a larger scale to render the illusion applicable to the whole person of the observer or even to groups of observers.

What I claim, and desire to secure by Letters Patent, is—

1. In apparatus for producing optical illusions, a framework supporting an object and a reflecting-surface, said reflecting-surface being perpendicular to the path of a ray from an observer which ray is coincident for an appreciable distance with a ray from said observer to said object.

2. In apparatus for producing optical illusions, the combination of an observer-locator, an object, and a reflecting-surface perpendicular to the path of a ray from said observer-locator which ray is coincident for an appreciable distance with a ray from said observer-locator to said object.

3. In apparatus for producing optical illusions, the combination of an observer-locator, an object and a reflecting-surface perpendicular to the path of a ray which is coincident for an appreciable distance with a second ray from said observer located to said object, said reflecting-surface being located at a distance from said observer-locator measured along said first ray approximately equal to half the distance from said observer-locator to said object measured along said second ray.

4. In apparatus for producing optical illusions, the combination of an object and a transparent body having two reflecting-surfaces inclined to one another, said transparent body arranged to reflect an image of said object to the observer from one of said reflecting-surfaces and to reflect an image of said object from the other of said reflecting-surfaces to a point without the field of vision of the observer.

5. In apparatus for producing optical illusions, the combination of an object and two reflecting-surfaces, one of said reflecting-surfaces arranged to present an image of the observer or selected portion of the observer to the vision of the observer and the other of said reflecting-surfaces arranged to present an image of said object to the observer as apparently occupying the same portion of space as the said image of the observer.

6. In apparatus for producing optical illusions, the combination of an object and a wedge-shaped glass, the rearward surface of said glass being silvered, and said glass and said object arranged to present to the vision of the observer an image of the observer or selected portion of the observer reflected from said silvered surface and an image of said object reflected from the forward wedge-surface of said glass and apparently occupying the same portion of space as said image of the observer or selected portion of the observer.

7. In apparatus for producing optical illusions, the combination of two objects and two reflecting-surfaces inclined to one another, said reflecting-surfaces being arranged relatively to said objects to receive respectively the rays from said objects and reflect said rays coincidently, presenting in the line of reflection images of both of said objects apparently occupying the same portion of space.

8. In apparatus for producing optical illusions, the combination of two objects, a transparent reflecting-surface and a second reflecting-surface inclined to said transparent reflecting-surface, said reflecting-surfaces arranged relatively to said objects to reflect rays from one of said objects from said transparent reflecting-surface and rays from said other object from said second reflecting-surface through said transparent reflecting-surface to coincide with the said reflected rays from said transparent reflecting-surface producing in the line of reflection images of both of said objects apparently occupying the same portion of space.

9. In apparatus for producing optical illusions, a framework supporting an object and a reflecting-surface, said reflecting-surface being perpendicular to the path of a ray from an observer which ray is coincident for an appreciable distance with a ray from said observer to said object, and which reflecting-surface is only of such area as is required to present a full reflection of the observer to himself or herself.

10. In apparatus for producing optical illusions, a framework, an object supported upon said framework, a reflecting-surface supported upon said framework and an observer-locator supported upon said framework before said reflecting-surface for determining the correct position and distance of the observer before said reflecting-surface, said reflecting-surface mounted to effect a coincidence between the paths of a ray perpendicular to said reflecting-surface and leading to the observer and a ray from said object to said observer.

11. In apparatus for producing optical illusions, the combination of an observer-locator, an object, a reflecting-surface perpendicular to the path of a ray which ray is coincident for an appreciable distance with a ray from said observer-locator to said object, lights arranged to fall upon said object and said observer-locator and mechanism in connection with said lights and adapted to initially light up the said light upon said observer-locator and thereafter gradually cause the said light upon said object to predominate that upon said observer-locator to effect a predominance of the image of said object over that of said observer-locator and observer located therein.

12. In apparatus for producing optical illusions, the combination of an object, and an observer-locator, a reflecting-surface perpendicular to the path of a ray from said observer-locator which ray is coincident for an appreciable distance with a ray from said object to said observer-locator, a light-producing member mounted to shed light upon the field of said observer-locator, a light-producing member mounted to shed light upon said object, said lights shielded from said reflecting-surfaces and automatic mechanism for initially causing said first-mentioned light-producing member to shed light upon the field of said observer-locator and thereafter to gradually cause said second light-producing member to light up said object until the image of said object presented to said observer-locator shall predominate that of said observer-locator and render that of said observer-locator and observer located therein practically invisible.

13. In apparatus for producing optical illusions, the combination of an object, two reflecting-surfaces, one of said reflecting-surfaces arranged to present an image of the observer or selected portion of the observer to the vision of the observer and the other of said reflecting-surfaces arranged to present an image of said objects to the observer as apparently occupying the same portion of space as the said image of the observer, a light-producing member mounted to shed light upon said observer, a light-producing member mounted to shed light upon the said object, mechanism automatically lighting up said first light-producing member and thereafter gradually lighting up said object until the image of said object predominates the image of said observer, a release for said mechanism and an automatic stop for said mechanism operating to stop said mechanism at a point where both of said light-producing members will be inactive.

14. In apparatus for producing optical illusions, the combination of an observer-locator an object, a reflecting-surface perpendicular to the path of a ray which ray is coincident for an appreciable distance with a ray from said observer-locator to said object, an electric light mounted to shine upon the field of said observer-locator a second electric light mounted to shine upon the said object a rheostat arranged to initially light up said first-named electric light and thereafter gradually light up said second-named electric light and then cut out both electric lights a motor driving said rheostat and an automatic stop adapted to stop said motor at a point where both of said electric lights are cut out.

15. In apparatus for producing optical illusions, the combination of an object, a wedge-shaped glass, the rearward wedge-surface of said glass being silvered, and said glass and said object arranged to present to the vision of the observer an image of the observer or selected portion of the observer reflected from said silvered surface and an image of said object reflected from the forward wedge-surface of said glass and apparently occupying the same portion of space as said image of the observer or selected portion of the observer, an electric light mounted to shine on the said observer a second electric light mounted to shine on the said object a rheostat adapted to initially light up said first-named electric light and thereafter gradually light up said second electric light until the said image of the said object predominates the said image of the said observer and then cut out both of said electric lights, a motor for driving said rheostat and an automatic stop for stopping said motor when both of said electric lights have been cut out.

16. In apparatus for producing optical illusions, the combination of a casing having an aperture therein comprising an observer-locator, a wedge-shaped glass having its rearward wedge-surface silvered mounted in said casing to present to the vision of an observer located in said observer-locator an image of said observer reflected from said silvered surface, an object mounted within said casing to present to the said observer an image of said object reflected from the forward wedged surface of said glass apparently occupying the same portion of space as said image of the observer, shields surrounding the fields of vision within said casing of the observer, an electric light of relatively low candle-power mounted within said casing to shine upon said observer, an electric light of relatively high candle-power mounted within said casing to shine upon said object and shielded from said reflecting-surfaces of said glass and said observer, a rheostat mounted within said casing connected with said electric lights and arranged to initially light up said electric light shining upon said observer and thereafter gradually light up said electric light shining upon said object until the said image of said object predominates that of said observer and then to cut out both of said electric lights, a motor mounted within said casing to drive said rheostat, a release for said motor and an automatic stop for said motor stopping said motor at a point when both of said electric lights are cut out by said rheostat.

In testimony whereof I have signed my name to this specification, in the presence of two subscribing witnesses, this 5th day of October, 1903.

MARCUS C. HOPKINS.

Witnesses:
 S. L. MERSHON,
 FREDERICK CRANE.